No. 735,072. PATENTED AUG. 4, 1903.
W. L. DOUGHTY.
ADJUSTABLE MIRROR.
APPLICATION FILED MAR. 7, 1903.
NO MODEL.

Witnesses.
Inventor.
William L. Doughty
By Benedict, Morsell & Green
Attorneys.

No. 735,072. Patented August 4, 1903.

UNITED STATES PATENT OFFICE.

WILLIAM L. DOUGHTY, OF OSHKOSH, WISCONSIN.

ADJUSTABLE MIRROR.

SPECIFICATION forming part of Letters Patent No. 735,072, dated August 4, 1903.

Application filed March 7, 1903. Serial No. 146,672. (No model.)

*To all whom it may concern:*

Be it known that I, WILLIAM L. DOUGHTY, residing at Oshkosh, in the county of Winnebago and State of Wisconsin, have invented a new and useful Improvement in Adjustable Mirrors, of which the following is a description, reference being had to the accompanying drawings, which are a part of this specification.

My invention has relation to improvements in adjustable mirrors, more particularly, although not necessarily, intended for use in connection with articles of furniture, such as dressers, bureaus, chiffonniers, dressing-tables, and other articles on which mirrors are used.

The primary object of the invention is to provide a construction whereby different adjustments of the mirror may be obtained. In an ordinary toilet the glass or mirror is capable of merely a forward and rearward swing, and when the dresser is arranged close to a wall it is impossible to give the mirror the proper tilt. By my invention the glass may be tilted to any desired position notwithstanding the fact that the dresser may be against the wall.

Another object of the invention is the provision of means whereby the glass may be so adjusted that a desirable reflection can be obtained regardless of the direction from which the light strikes the glass.

Figure 1:
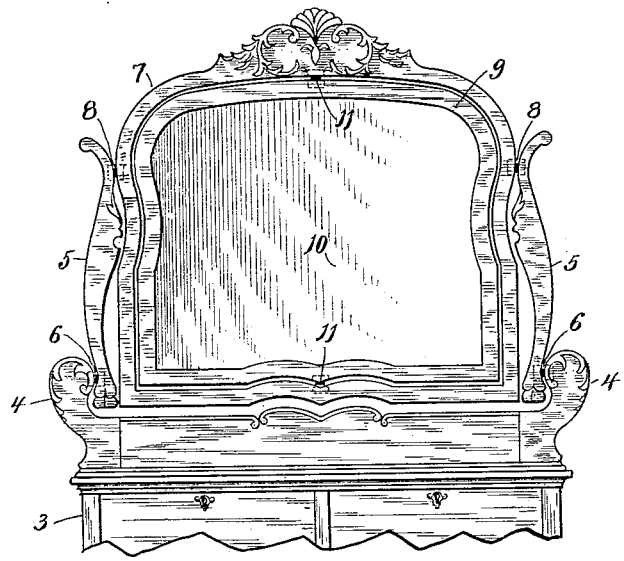
Figure 2:
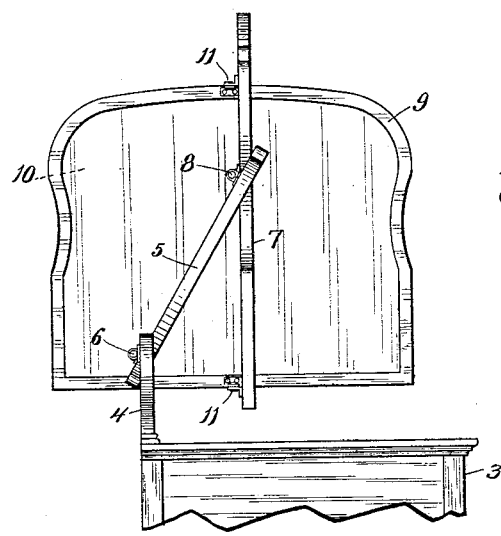

In the accompanying drawings, Figure 1 is an elevation of the upper portion of a dresser equipped with my improvements, the glass or mirror being in an upright position. Fig. 2 is a view at right angles to Fig. 1 with the standards tilted outwardly and the mirror turned at right angles to the position shown in Fig. 1.

Referring to the drawings, the numeral 3 indicates the lower portion of an ordinary form of dresser. The upper rear portion of this dresser is provided with upward projections 4 4, to which are pivoted the lower ends of standards 5 5, the pivots being indicated by the numerals 6 6. An outer frame 7 is pivotally suspended from the standards 5 on pivots 8 8, said pivots adapting the frame to be swung forwardly and rearwardly. Within the frame 7 is a frame 9, having the glass or mirror 10 set therein. This frame 9 is pivoted to the frame 7 on vertical pivots 11 11 at the centers of the upper and lower sides of frame 9 and at corresponding points of the frame 7.

From the foregoing description it will be seen that not only is the outer frame capable of being swung forward and backward, but the inner frame, which contains the glass, may be swung to the right or left and that in addition both frames may be swung forward with the standards. It will therefore be evident that where a dresser or other article to which the invention is applied is close to a wall the standards may be swung forward, thus bringing the glass far enough from the wall to permit tipping of the glass-frame to any desired position, and by this movement the glass may be brought so near the front of the dresser that a slight inclination of the body will bring a person's face close to the glass. Another advantage is that in various movements of these frames the glass may be brought to a position where a desirable reflection can be obtained regardless of the direction from which the light strikes it. This is particularly desirable in the evening, when artificial light is used, inasmuch as where the light cannot be placed so as give the desired reflection the glass can be moved so as to obtain such reflection.

While I have shown the invention in connection with a dresser, yet, as before stated, it may be used in connection with other articles of furniture, such as bureaus, chiffonniers, dressing-tables, or any other article on which mirrors are used. In fact, the invention may be included in a hanging mirror, and in this embodiment supports may be provided to take the place of the supports 4 4 and these supports extended upwardly to form the means for hanging the mirror on the wall, and the standards 5 may be pivoted to said hanging supports, and thus all the elements of the invention preserved.

What I claim as my invention is—

In a mirror, the combination with fixed supports, of standards pivoted to the upper ends of the same, an outer frame pivotally hung between the upper ends of said standards, the pivots being arranged above the center of the frame, and an inner mirror-frame pivoted vertically within the said outer frame.

In testimony whereof I affix my signature in presence of two witnesses.

WILLIAM L. DOUGHTY.

Witnesses:
E. A. SEVERSON,
H. W. DEMGEN.